US008682399B2

(12) United States Patent
Rabu

(10) Patent No.: US 8,682,399 B2
(45) Date of Patent: Mar. 25, 2014

(54) DETECTING DOCKING STATUS OF A PORTABLE DEVICE USING MOTION SENSOR DATA

(75) Inventor: Stanley Rabu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1134 days.

(21) Appl. No.: 12/638,454

(22) Filed: Dec. 15, 2009

(65) Prior Publication Data

US 2011/0141006 A1    Jun. 16, 2011

(51) Int. Cl.
*H04M 1/00* (2006.01)

(52) U.S. Cl.
USPC ............... 455/569.2; 455/550.1; 455/566

(58) Field of Classification Search
USPC ............ 455/550.1, 566, 569.2, 575.1, 575.6, 455/575.9, 90.3; 379/433.04
See application file for complete search history.

(56) References Cited

U.S. PATENT DOCUMENTS

| 7,352,567 | B2 | 4/2008 | Hotelling et al. |
|---|---|---|---|
| 7,499,232 | B2 | 3/2009 | Hodge et al. |
| 2008/0234935 | A1 | 9/2008 | Wolf et al. |
| 2008/0254822 | A1 | 10/2008 | Tilley |
| 2008/0254837 | A1* | 10/2008 | Klinghult et al. ............. 455/566 |
| 2009/0058687 | A1 | 3/2009 | Rothkopf et al. |
| 2009/0061841 | A1 | 3/2009 | Chaudhri et al. |
| 2009/0063660 | A1 | 3/2009 | Fleischman et al. |
| 2009/0064038 | A1 | 3/2009 | Fleischman et al. |
| 2009/0088204 | A1 | 4/2009 | Culbert et al. |
| 2009/0141046 | A1 | 6/2009 | Rathnam et al. |
| 2009/0179854 | A1 | 7/2009 | Weber et al. |
| 2009/0189803 | A1 | 7/2009 | Beason |
| 2009/0209293 | A1* | 8/2009 | Louch ........................... 455/566 |
| 2009/0229892 | A1 | 9/2009 | Fisher et al. |
| 2010/0304754 | A1* | 12/2010 | Czompo et al. ............ 455/456.1 |

OTHER PUBLICATIONS

Ogawa, A., et al., "Identification of human activity modes with wearable sensors for autonomous human positioning system", $22^{nd}$ Asian Conference on Remote Sensing, Centre for Remote Imaging, Sensing and Processing (CRISP), National University of Singapore, Singapore Institute of Surveyors and Valuers (SISV), Asian Association on Remote Sensing (AARS), Nov. 5-9, 2001, Singapore, 4 pages.

\* cited by examiner

*Primary Examiner* — Ping Hsieh
(74) *Attorney, Agent, or Firm* — Jennifer Luh

(57) ABSTRACT

Methods for operating a portable media device are provided. The method includes determining an orientation angle of the portable media device and a frequency spectrum associated with a motion of the portable media player. Based on the orientation angle and the frequency spectrum, the portable media player can determine a motion status and select a mode of operation based on the motion status. In addition, the method also includes determining whether the portable media player is in a dock, resting on a surface, or being handled by a person. The method further includes determining whether the portable media player is located in a moving vehicle, in a stationary vehicle, being held by a moving person, or being held by a stationary person.

23 Claims, 8 Drawing Sheets

| PMD Modes | Description |
|---|---|
| A | PMD handheld while located in a moving vehicle. |
| B | PMD resting in a moving vehicle |
| C | PMD handheld while person is in motion. |
| D | PMD docked in a moving vehicle |
| E | PMD docked in a desktop dock and stationary |
| F | PMD resting on a stationary surface |
| G | PMD docked in a stationary vehicle |

__US 8,682,399 B2__

DETECTING DOCKING STATUS OF A PORTABLE DEVICE USING MOTION SENSOR DATA

BACKGROUND

The present disclosure relates generally to portable media devices and in particular to determining a docking status of a portable media device using data from one or more motion sensors.

Modern portable media devices are increasingly being manufactured with some form of integrated motion detection built into the mobile device. The primary use for these integrated motion detection devices is to detect any freefall of the portable mobile device or determine the orientation of the portable media device.

Some portable media devices are configured to change the screen orientation based on the orientation of the portable media device. Most of the portable media devices that are capable of detecting orientation have an accelerometer built into the mobile device. An accelerometer is a device that measures the acceleration it experiences relative to freefall. Single and multi-axis accelerometers are available that can detect magnitude and direction of the acceleration as a vector quantity, and can be used to sense orientation, vibration, and shock.

Most of the portable media devices that have a built-in accelerometer use the accelerometer to provide limited amount of functionality like determining screen orientation, providing power management, and providing a user input tool such as shuffling media tracks stored in the portable media device when the user shakes the portable media device.

SUMMARY

Certain embodiments of the present invention relate to a portable media player (PMD) that includes one or more motion sensors, e.g., an accelerometer, a gyroscope, etc. built into the PMD. A PMD according to an embodiment of the present invention uses information received from the one or more motion sensors to determine a motion and orientation status of the PMD. In some embodiments, the motion status may be a combination of a PMD holder status and a PMD holder motion status. The holder status can indicate how the PMD is being held, e.g., whether the PMD is docked in a dock, whether the PMD is resting on a surface, or whether the PMD is being held by a person. The holder motion status can indicate whether the holder, e.g., dock, the person, or the surface, is located in a moving vehicle or a stationary vehicle or in the case when the holder is a person, the holder motion status can indicate whether the person is walking or stationary.

In some embodiments, the PMD can detect the holder status and the holder motion status and determine a motion status of the PMD based on the holder status and the holder motion status. Depending on the motion status of the PMD, the PMD can choose a particular mode of operation. In some embodiments, the PMD can select a mode of operation from list of pre-defined modes.

In some embodiments, the PMD holder status can include determining whether the PMD is docked, resting on a surface, or being held by a person. In some embodiments, the PMD holder motion status can include determining whether the PMD is in a moving vehicle, in a stationary vehicle, being held by a moving person, or being held by a stationary person. In some embodiments, the PMD can determine holder status by calculating the orientation angle of the PMD with respect to a surface, e.g., ground, dock, etc. The value of the orientation angle can be used to determine the holder status. In some embodiments, the PMD can determine a frequency spectrum associated with its current motion based on inputs from the accelerometer and the gyroscope. Based on the determined frequency spectrum, the PMD can determine whether it is in a moving vehicle, in a stationary vehicle, being held by a moving person, or being held by a stationary person. Once the PMD determines its holder motion status, the PMD can automatically select a mode of operation associated with that motion status.

The following detailed description, together with the accompanying drawings will provide a better understanding of the nature and advantages of the present invention.

DETAILED DESCRIPTION

Certain embodiments of the present invention relate to a portable media device (PMD) that uses motion sensor data to determine its motion status. In some embodiments, there can be two different types of motion status associated with the PMD. First, the PMD can have a holder status. The holder status can indicate how the PMD is being held, e.g., whether the PMD is docked in a dock, whether the PMD is resting on a surface, or whether the PMD is being held by a person. Second, the PMD can have a holder motion status. The holder motion status can indicate whether the holder, e.g., dock, a person, or the surface, is in a moving vehicle, a stationary vehicle, moving outside a vehicle, e.g., walking, or is stationary.

In some embodiments, the PMD can use inputs from internal motion sensors, such as an accelerometer and a gyroscope, to determine an orientation angle of the PMD. The orientation angle can be used to determine the holder status. In some embodiments, the PMD can determine a frequency spectrum associated with a current motion of the PMD (and holder). Based on the determined frequency spectrum, the PMD can determine the holder motion status. In addition, the PMD can select a mode of operation based on the holder status and the holder motion status. Every motion has a particular frequency spectrum associated with that motion. For example, a car travelling at 65 mph will generate a certain frequency spectrum associated with its motion that is distinct from the frequency spectrum generated when that same car is stopped at a signal light. By examining the frequency spectrum for a motion of an object, it can be possible to determine the type of motion being experienced by that object.

Figure 1:
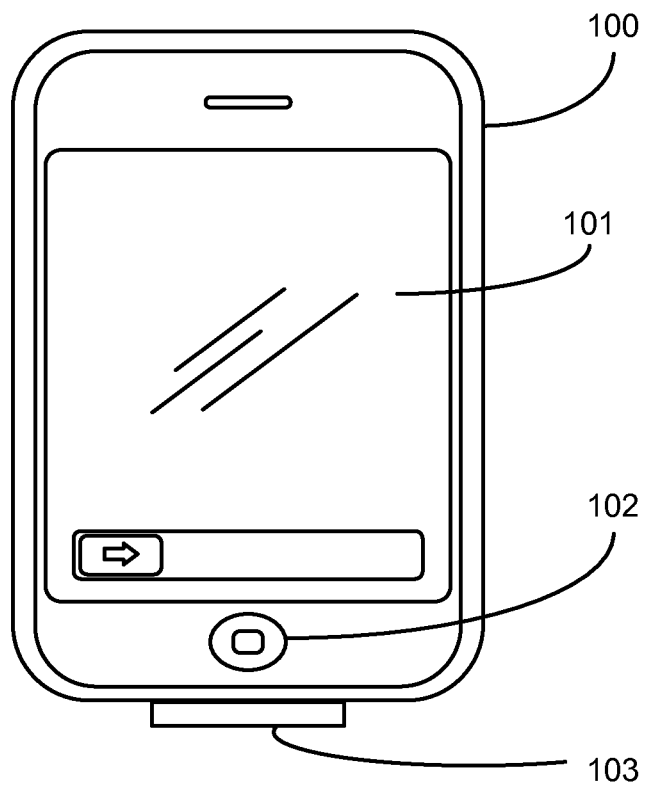
FIG. 1 illustrates a portable media device according to an embodiment of the present invention.

FIG. 1 illustrates a PMD 100 according to an embodiment of the present invention. PMD 100 can include a screen 101, a button 102, and a connector 103, among other features. The screen 101 can be a touch screen that includes a tactile interface. A user can interact with PMD 100 via a user interface (not shown) and screen 101. Button 102 can be used to return PMD 100 to its "home" state. Connector 103 can be a multi-pin connector capable of connecting to external devices, e.g., a charger, a dock, etc. In some embodiments, connector 103 can be configured to mate with a corresponding connector on a dock. In some embodiments, PMD 100 includes an accelerometer (not shown) and a gyroscope (not shown). The accelerometer can be a multi-axis accelerometer or a single-axis accelerometer. In some embodiments, PMD 100 can be a mobile device that includes computing, communication, and/or media playback capabilities. In some embodiments, PMD 100 can include a smart phone, personal media player, portable digital assistant, and the like.

Figure 2:
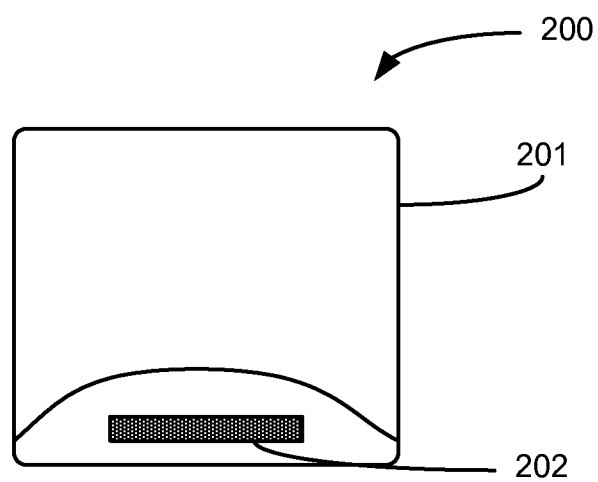
FIG. 2 illustrates a portable media device dock according to an embodiment of the present invention.

FIG. 2 illustrates a dock 200 according to an embodiment of the present invention. Dock 200 includes a base 201 and a connector 202. Base 201 provides mechanical support and stability for dock 200. Connector 202 is configured to accept a mating connector on a PMD, e.g., connector 103 of FIG. 1. Dock 201 can provide various functionality including but not limited to providing power to the PMD, transferring data to and from the PMD, etc. Dock 201 illustrated in FIG. 2 is an example for a type of dock that can be used with PMD 200. Various other types of docks with varying functionalities can also be used with the PMD, e.g., automobile docks, bicycle docks, etc. In some embodiments, a dock might not have any mating connector, e.g. a vehicle holder. Such a dock is merely used to hold the PMD securely in place and does not interact with the PMD by exchanging commands and/or data. For example, a holder dock can mounted in a vehicle or placed on a table top.

Figure 3:
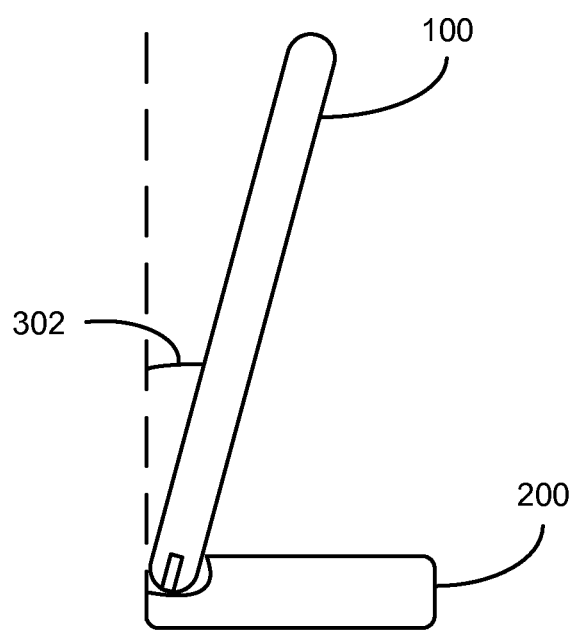
FIG. 3 illustrates a functional diagram of a portable media device coupled to the portable media device dock according to an embodiment of the present invention.

FIG. 3 illustrates PMD 100 coupled to dock 200 according to an embodiment of the present invention. As can be seen, in this position, PMD 100 is at an angle 302 with respect to the dock. In one embodiment, this angle can be measured by the internal accelerometer and gyroscope of PMD 100. In some embodiments, angle 302 can be referred to as an orientation angle. The orientation angle can be different depending on the dock used to mount the PMD. For example, in one embodiment, when PMD 100 is coupled to dock 200 (e.g., a desktop dock), PMD 100 can be at an angle of 15° with respect to a vertical axis. In this embodiment, when the PMD detects that it is at an angle of 15°, in addition to other measurements, the PMD may conclude that it is coupled to dock 200 and can switch to an associated mode of operation. One skilled in the art will realize that various other orientation angles for PMD 100 are possible. Each of the orientation angles may suggest a particular holder status for the PMD. For example, in some embodiments, the orientation angle of PMD 100 when it is being held by a person will be different than the orientation angle when PMD 100 is docked in a dock, and the orientation angle of PMD 100 when it is resting on a surface can be different from either of the cases described above. In some embodiments, by analyzing the orientation angle of PMD 100 it is possible to determine whether PMD 100 is docked, resting, or being held by a person.

It is to be noted that the PMD and the dock described above are for illustration purposes only. In some embodiments, the dock may only hold the PMD without being in electrical contact with the PMD. The orientation angle described above presents only one embodiment of the PMD being docked in a dock. In some embodiments, the orientation angle when the PMD is docked can be different from 15° and can depend on the dock and location of the dock with respect to a surface, e.g., a dock that is attached to the air vents in a car may hold the PMD in a different orientation angle than a dock that is sitting on a table.

Figures 4, 5:
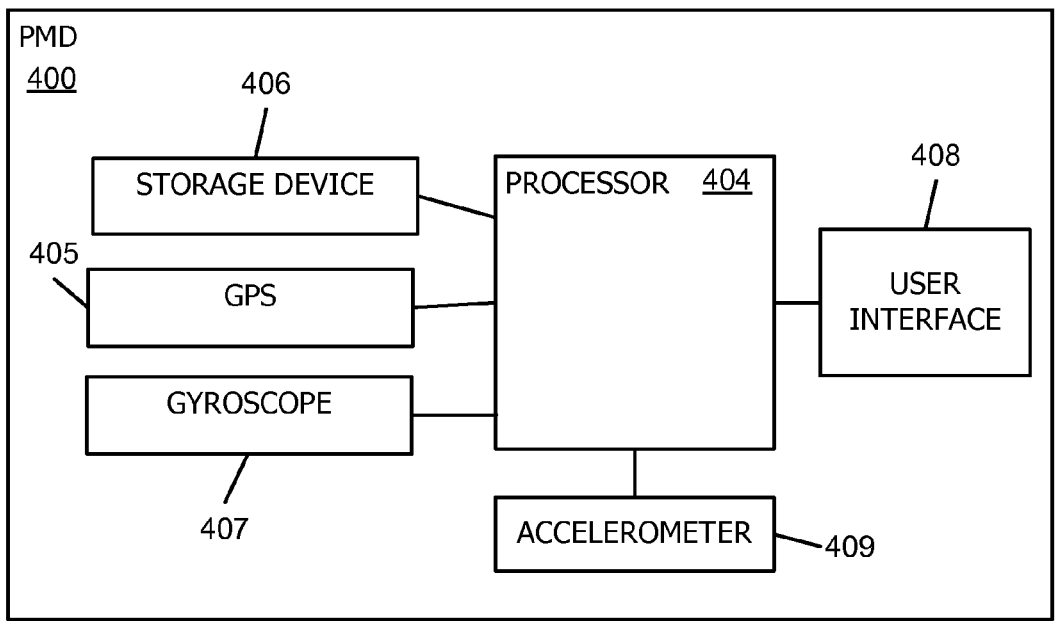
FIG. 4 is a block diagram illustrating the functional components of a portable media device according to an embodiment of the present invention.
FIG. 5 is a table listing various modes of operation of the portable media device according to an embodiment of the present invention.

FIG. 4 is a block diagram of a PMD 400 (e.g., implementing PMD 100 of FIG. 1) according to an embodiment of the present invention. PMD 400 can include a processor 404, a user interface 408, an accelerometer 409, a gyroscope 407, a global positioning system (GPS) device 405, and a storage device 406, among other components.

Accelerometer 409, which can be of generally conventional design, may be a single axis accelerometer or a multi-axis accelerometer. In some embodiments, accelerometer 409 can be implemented as a micro electromechanical system (MEMS) device embedded in PMD 400. Accelerometer 409 can measure acceleration due to gravity. Based on that measurement, processor 404 can determine the angle it is tilted at with respect to vertical, horizontal, or any other reference plane. In some embodiments, accelerometer 409 can sense the amount of dynamic acceleration. Based on this information, processor 404 can determine a frequency spectrum associated with the holder motion and consequently determine the motion status of PMD 400.

Gyroscope 407, which can be of generally conventional design, can measure orientation of PMD 400 based on the principles of angular momentum. In some embodiments, gyroscope 407, in conjunction with accelerometer 409, can provide information regarding the orientation of PMD 400 to processor 404. The processor 404 can then determine an orientation angle of PMD 400.

GPS device 405 can provide the location of PMD 400 in 3-dimensional coordinates (e.g., latitude, longitude, and altitude) plus the time. In some embodiments, processor 404 may use input from GPS device 405 to determine whether a vehicle or a person holding PMD 400 is moving or stationary. In some embodiments, GPS device 405 can continuously send the GPS information to processor 404. Based on the GPS information, processor 404 can calculate a location of PMD 400. In some embodiments, processor 404 can determine a first location of PMD 400. After a certain period of time, e.g., 5 mins, processor 404 can determine a second location of PMD 400. If the difference between the first location and the second location is more than a threshold, e.g., 100 feet, the processor can conclude that PMD 400 is moving. In some embodiments, the difference between the first location and the second location may also be used to determine whether PMD 400 is moving fast, e.g., in a moving vehicle, or moving slowly, e.g., being carried by a walking person.

User interface 408 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., motion sensors, digital-to-analog or analog-to-digital converters, signal processors, circuitry for determining motion frequency spectrum, or the like). A user can operate the various input controls of user interface 408 to invoke the functionality of PMD 400 and can view and/or hear output from PMD 400 via user interface 408.

Processor 404, which can be implemented as one or more integrated circuits (e.g., a conventional microprocessor or microcontroller), can control the operation of PMD 400. For example, processor 404 can receive inputs from accelerometer 409, GPS device 405, and gyroscope 407 to calculate an orientation angle of PMD 400 and a frequency spectrum associated with a motion of PMD 400. In some embodiments, processor 404 can select a mode of operation for PMD 400 based on the information from accelerometer 409 and gyroscope 407. In some embodiments, processor 404 can communicate the selected mode to an application resident in PMD 400.

Storage device 406 can be implemented, e.g., using disk, flash memory, or any other non-volatile storage medium. In some embodiments, storage device 406 can store media assets, such as audio, video, still images, or the like, that can be played by PMD 400. Storage device 406 can also store one or more reference frequency spectra associated with various motions corresponding to a vehicle and a person. These frequency spectra can be used in determining motion status of the PMD, e.g., as described below. Storage device 406 can also store other information such as information about a user's contacts (names, addresses, phone numbers, etc.), scheduled appointments and events, notes, and/or other personal information. In some embodiments, storage device 206 can store one or more other programs to be executed by processor 404 (e.g., video game programs, personal information management programs, navigation applications, media playback programs, etc.). Storage device 406 may further include programs to determine the motion status of the PMD, e.g., as described below.

It will be appreciated that the system configurations and components described herein are illustrative and that variations and modifications are possible. For instance, the PMD can use other location detection sensors such as cell phone towers, WiFi hotspots, etc to determine its location. The PMD can have other capabilities not specifically described herein. Further, while the PMD is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

In some embodiments, the PMD may operate in different modes depending on the PMD's motion status. FIG. 5 shows a table 500 listing some of the modes of operation for a PMD (e.g., PMD 400 of FIG. 4). The list of modes shown is for illustrative purposes only and one skilled in the art will realize that many other modes in addition to the listed modes or in lieu of the listed modes are possible. Some embodiments may also provide fewer modes than those listed.

Mode A can be selected when it is determined that the PMD is being held by a person (holder status) and that the person is located in a moving vehicle (holder motion status). Mode B can be selected when it is determined that the PMD is resting on a surface and that the surface is located in a moving vehicle, e.g., passenger seat of a moving car. Mode C can be selected when it is determined that the PMD is being held by a person and the person is moving, but the person is not moving as fast or in a pattern corresponding to a moving vehicle, e.g., walking, running, or jogging. Mode D can be selected when it is determined that the PMD is docked in a car dock (e.g., based on orientation angle) and the dock is located inside a moving vehicle (e.g., based on accelerometer information and GPS signals). Mode E can be selected when it is determined that the PMD is docked in a desktop dock and the desktop dock is resting on a stationery surface, e.g. a desk. Mode F can be selected when it is determined that the PMD is resting on a stationary surface, e.g., laying flat on a desk. Mode G can be selected when it is determined that the PMD is docked in a vehicle dock and that dock is located in a stationary vehicle. As described above, once the processor determines the holder status and the holder motion status, the processor can select any one of the modes described above and operate the PMD in that mode. In some embodiments, one of the modes described above can be designated as the "default" mode. Whenever the PMD is unable to determine either the holder status or the holder motion status, the PMD can be placed in this default mode of operation.

It is to be noted that the modes described above are for illustration purposes only. One skilled in the art will realize that many other modes can be defined based on the holder status and holder motion status. For instance, if it is determined that the PMD is docked and the PMD experiences a motion similar to the motion corresponding with being held by a person, the PMD can conclude that a person is holding the dock with the PMD in it and moving the dock. A new mode X can be assigned to this situation. One skilled in the art will realize that the modes can be user programmable and modes can be created, deleted, and/or modified based on user preferences.

In some embodiments, one or more features of the PMD can be associated with one or modes described above. In some embodiments, whenever a mode of operation is selected, the features associated with that mode can be automatically enabled by the PMD and features not associated with that mode can be automatically disabled. For example, in some embodiments where the PMD includes mobile telephone capability, if mode D is selected, the PMD can automatically enable the speaker phone feature for all telephone calls made or received using the PMD. This eliminates the need for the user to manually enable or disable features on the PMD, e.g., by changing preferences. Each mode of operation can be programmed to have one or more features associated with that mode such that whenever a mode is selected, all the features associated with that mode are automatically enabled.

In some embodiments, once a mode is selected, the processor can send information about the selected mode to one or more applications resident on the PMD. The application that receives the mode information can then use that information as part of the application's operation. For example, consider a navigation application resident on the PMD. The navigation application can be configured to provide navigation information to the user. The navigation application can provide routing and point to point directions to a user based on the user's mode of transportation, e.g., driving, riding on a bicycle, or walking. The navigation information provided to the user can vary depending on the user's mode of transportation. A PMD incorporating an embodiment of the present invention can automatically determine the motion status, select a mode of operation, and send information about the selected mode to the navigation application. Based on the mode information, the navigation application can automatically determine whether the user is in a car, on a bicycle, or is walking. When the user executes the navigation application and wishes to get directions to a location, the navigation application can automatically provide navigation information based on the user's mode of transportation, e.g., in a car or walking. This can eliminate the need for the user to manually provide information about his mode of transportation to the navigation application.

Figure 6:
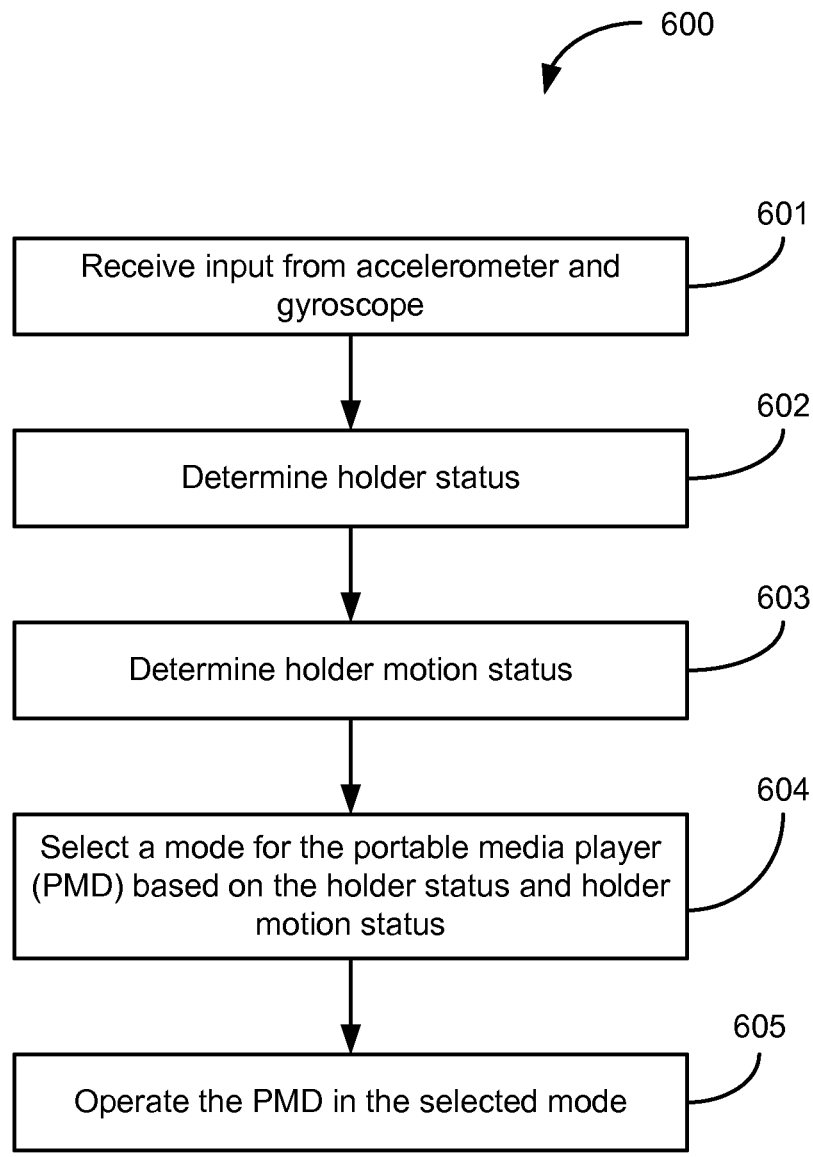
FIG. 6 is a flow diagram of a process for operating the portable media device according to an embodiment of the present invention.
Figure 7:
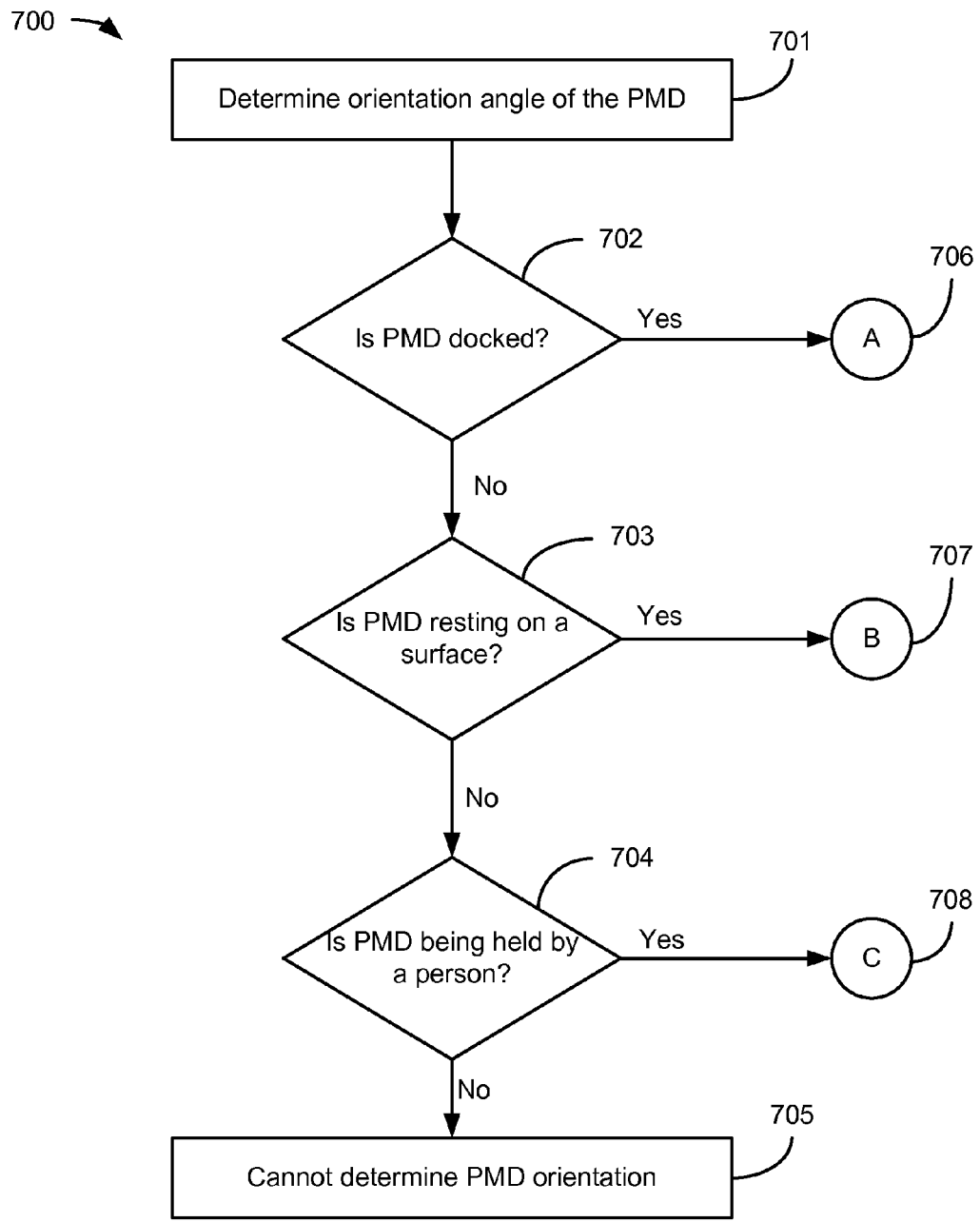
FIG. 7 is a flow diagram of a process for determining holder status according to an embodiment of the present invention.
Figure 8:
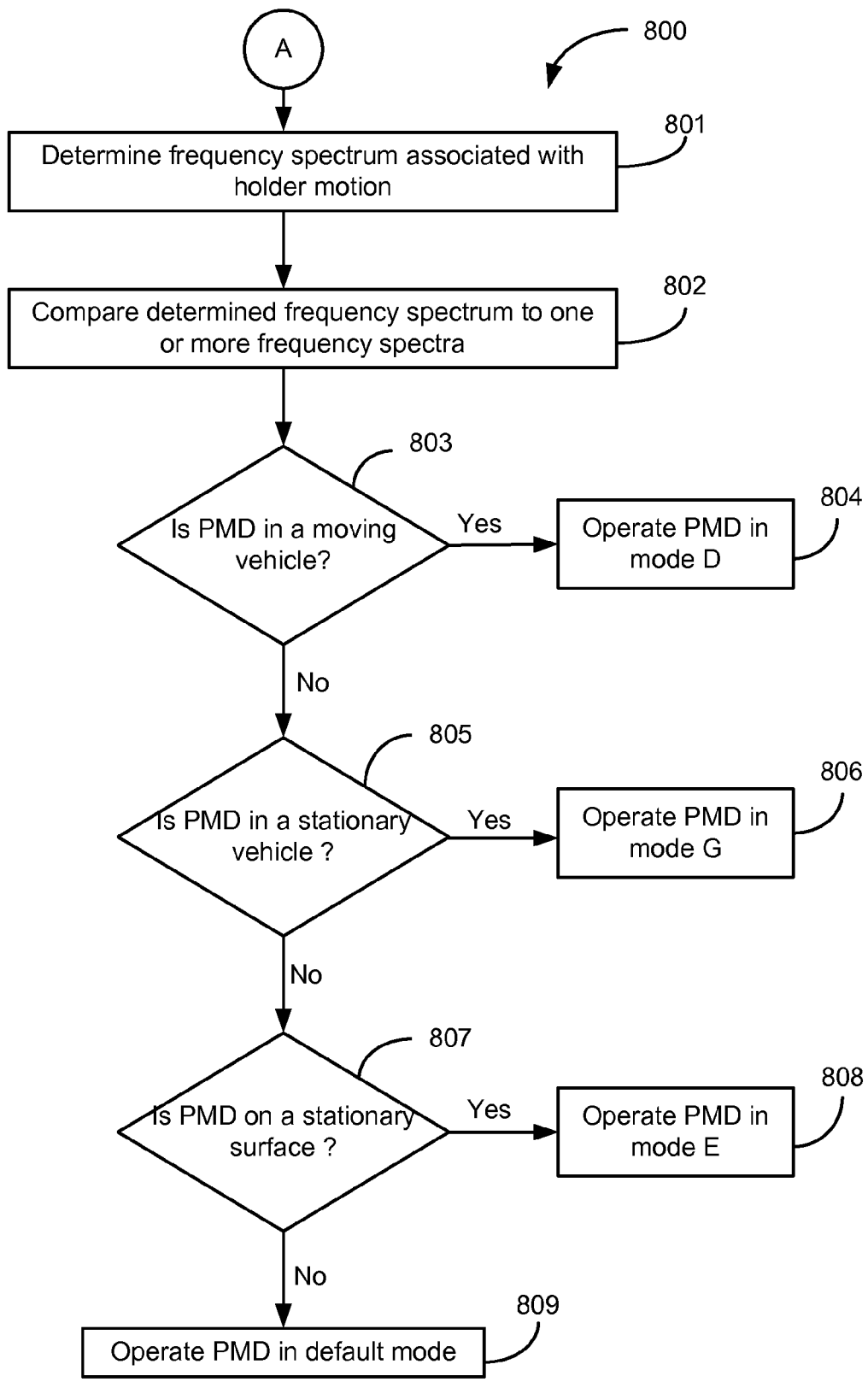
FIG. 8 is a flow diagram of a process for determining holder motion status according to an embodiment of the present invention.
Figure 9:
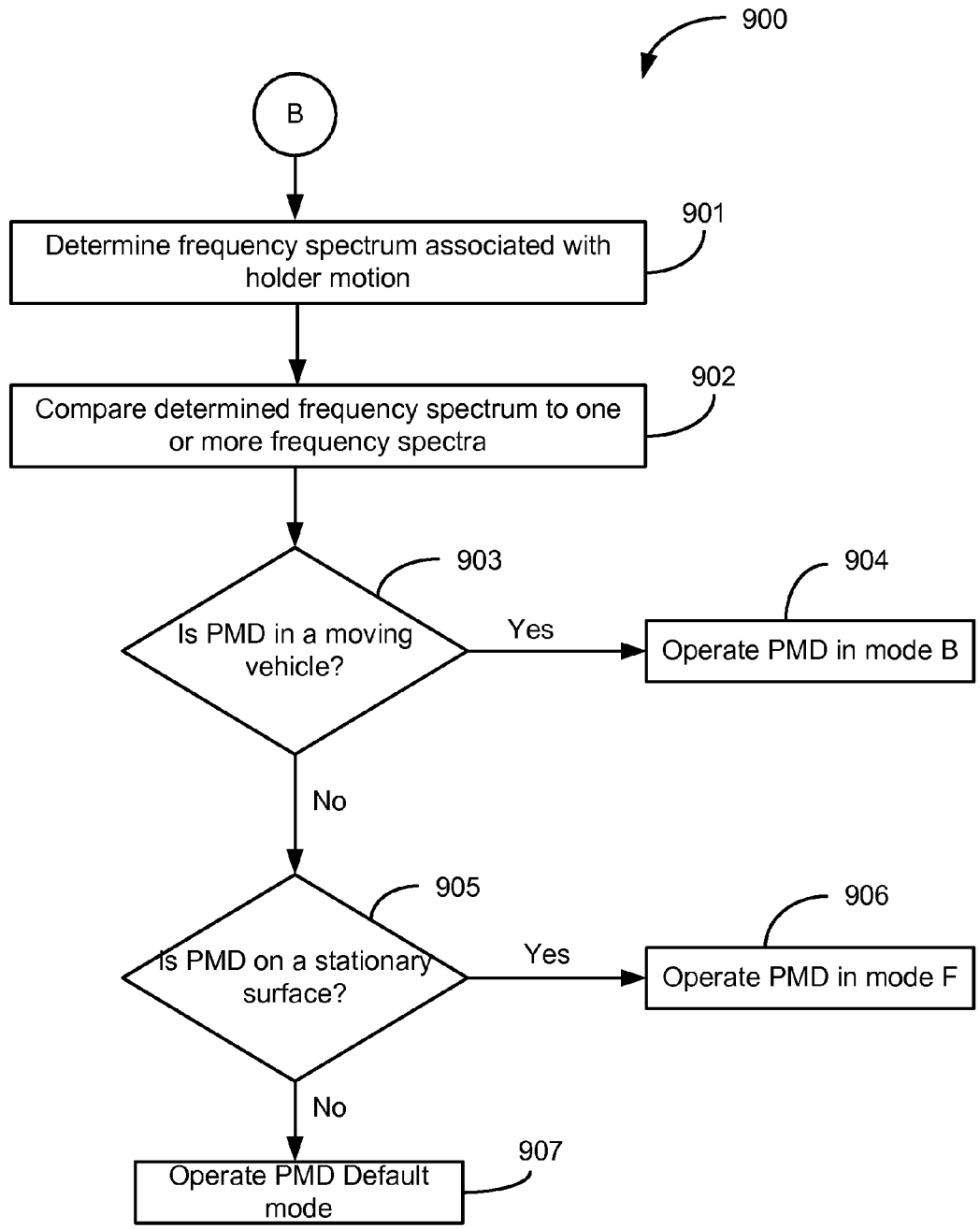
FIG. 9 is a flow diagram of a process for determining holder motion status according to another embodiment of the present invention.
Figure 10:
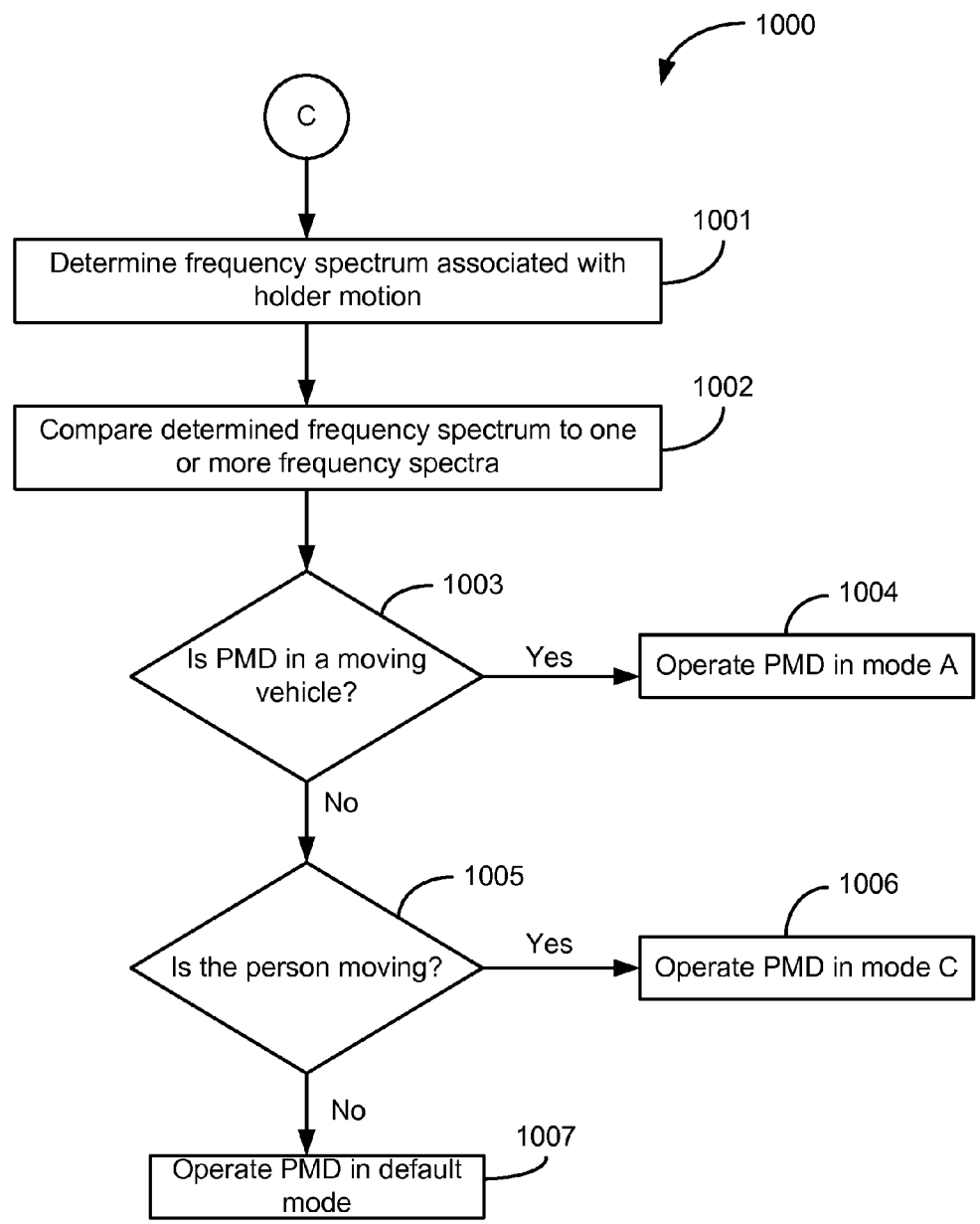
FIG. 10 is a flow diagram of a process for determining holder motion status according to yet another embodiment of the present invention.

Examples of techniques for determining the motion status will now be described. These techniques can be implemented, e.g., in PMD 400 of FIG. 4. FIG. 6 is a flow diagram of a process 600 for operating the portable media device (PMD) according to an embodiment of the present invention. At block 601, the PMD can receive input from one or more motion sensors, e.g., accelerometer and gyroscope. In some embodiments, the input can indicate orientation angle and motion information of the PMD. At block 602, the PMD can determine a holder status. For example, in one embodiment, if the orientation angle is 15° with the vertical, the PMD is held in a dock, if orientation angle is 90° to vertical the PMD is resting on surface, and if the orientation angle is varying then the PMD is being handled by a person. FIG. 7 described below, illustrates a process for determining the holder status. At block 603, the PMD can determine a holder motion status. For example, in one embodiment, the PMD can determine whether it is in a moving vehicle, in a stationary vehicle, being handled by a moving person, or being handled a stationary person. This determination can be made based on determining a frequency spectrum associated with the holder motion and comparing that to frequency spectra of known motions. FIGS. 8, 9, and 10, described below, illustrate various processes for determining the holder motion status.

In some embodiments, the frequency spectrum for a holder motion can be determined as described below. In general, different types of motion have different acceleration characteristics, e.g., high frequency vibration of a car, low frequency vibration when handheld. A frequency spectrum for each type of motion can be generated using the acceleration characteristics. In some embodiments, samples of accelerometer data corresponding to a particular motion are collected over time. The collected data is subjected to a Fourier transform, e.g., conventional Fast Fourier Transform (FFT) or other Fourier transform algorithm, to generate a frequency spectrum for that motion. The generated frequency spectrum can be compared to one or more reference frequency spectra of known motion types to determine the likely motion experienced by the PMD. For example, a motion spectrum associated with a car does not show a marked peak at any frequency values, but the amplitude gets larger at around 6-9 Hz and 11-14 Hz. A motion spectrum for a person walking shows measurable peaks in amplitude at 2 Hz, 4 Hz, 6 Hz etc., which match with the periodicity created by the walking motion. Other types of motion have motion spectra characteristic of that particular motion and are significantly different so that they may be compared to determine the type of motion experienced by the portable media device. Examples of motion spectra associated with different types of motion including walking, buses, cars, and trains are shown in Ogawa et al., "Identification of human activity modes with wearable sensors for autonomous human positioning system," 22nd Asian Conference on Remote Sensing, Singapore (2001), which is incorporated by reference herein in its entirety.

It is to be noted that in some embodiments, determination of the holder motion status at block 603 can depend on the determination of the holder status at block 601. For example, if at block 601 it is determined that the PMD is in a dock, the process of determining a holder motion status can exclude frequency spectra associated with a moving person or a stationary person.

Based on the determination of the holder status and the holder motion status, the PMD can select a mode of operation, e.g., one of the modes described in FIG. 5, at block 604. At block 605, the PMD can start operating in the selected mode.

It will be appreciated that process 600 described herein is illustrative and that variations and modifications are possible. Acts described as sequential can be executed in parallel, order of acts can be varied, and acts can be modified or combined. For instance, blocks 602 and 603 can be combined so that the PMD determines the holder status and the holder motion status concurrently.

FIG. 7 is a flow diagram of a process 700 for determining a holder status (e.g., block 603 of FIG. 6) of the portable media device according to an embodiment of the present invention. As described above, holder status can refer to the manner in which the PMD is held. In some embodiments, the orientation angle is used to determine the holder status. In other embodiments, other factors such as a status of the connector may be used to determine the holder status in addition to the orientation angle. At block 701, the PMD can determine an orientation angle at which the PMD is tilted with respect to a surface, e.g., ground. In some embodiments, information from the accelerometer and gyroscope can be used to determine the orientation angle. At block 702, the PMD can determine whether the measured orientation angle corresponds to the orientation angle when the PMD is docked in a dock. As described earlier, there can be various orientation angles associated with various positions of the PMD. In some embodiments, a list of orientation angles and their associated PMD positions can be stored in the storage device of the PMD. In this embodiment, once the PMD determines the orientation angle, the PMD can search the stored orientation angles to determine whether the measured orientation angle matches a stored orientation angle. If a match is found, the PMD position associated with that orientating angle is considered as the current holder status of the PMD.

If at block 702 it is determined that the measured orientation angle corresponds to the orientation angle of the PMD when the PMD is docked, process 700 can end and transition to a process for determining the holder motion status at block 706. The various processes for determining holder motion statuses are described in detail below. If at block 702 it is determined that the measured orientation angle does not correspond to the orientation angle of the PMD when the PMD is docked, the PMD checks to see whether the measured orientation angle corresponds to the orientation angle of the PMD when the PMD is resting on a surface, at block 703. If at block 703 it is determined that the measured orientation angle corresponds to the orientation angle of the PMD when the PMD is resting on a surface, process 700 can end and transition to a process for determining the holder motion status at block 707. If at block 703 it is determined that the measured orientation angle does not correspond to the orientation angle of the PMD when the PMD is resting on a surface, the PMD, at block 704, checks to see whether the measured orientation angle corresponds to the orientation angle of the PMD when the PMD is being held by a person. If at block 704 it is determined that the measured orientation angle fluctuates between several values, the PMD can determine that it is being held by a person and process 700 ends and transitions to a process for determining the holder motion status at block 708. However, if the PMD is unable to determine its orientation angle, process 700 can report an error at block 705 indicating that a holder status cannot be determined for the PMD. In some embodiments, the PMD may be placed in a default mode if the holder status cannot be determined.

It will be appreciated that process 700 described herein is illustrative and that variations and modifications are possible. Acts described as sequential can be executed in parallel, order of acts can be varied, and acts can be modified or combined. For instance, in some embodiments, the PMD may measure changes in the orientation angle over a period of time (monitoring period), e.g., 4 minutes, at block 701. If it is determined that the orientation angle is fluctuating between various values during the monitoring period, the PMD may conclude that the PMD is being held by a person and process 700 can directly transition to the process for determining holder motion status at block 708. If the orientation angle does not fluctuate during the monitoring period, as determined at block 701, process 700 can proceed to block 702. In some embodiments, an exact match between the measured orientation angle and the list of orientation angles may not be found. In such an instance, the PMD can look for a value of an orientation angle, from among the list of orientation angles, that closely matches the value of the measured orientation angle and conclude that the PMD is in a position associated with that stored orientation angle. In some embodiments, if the measured orientation angle is outside of a predetermined margin of error for matching, the PMD can conclude that it cannot determine the position and report an error.

FIG. 8 is a flow diagram for a process 800 for determining a holder motion status when the PMD is docked in a dock, according to an embodiment of the present invention. It is to be noted that prior to commencing process 800, the PMD may have determined that it is in a docked state, e.g., by using process 700. At block 801, the PMD can determine a frequency spectrum associated with the holder motion, e.g., the motion of the dock. In some embodiments, the frequency spectrum of the holder motion can be determined using information received from the accelerometer and the gyroscope. Once the frequency spectrum of the holder motion is determined, the PMD can compare the frequency spectrum to one or more frequency spectra stored in its storage device, at block 802. In some embodiments, various frequency spectra associated with various types of motion can be stored in the storage device of the PMD. For example, the types of motion can include a moving vehicle, a stationary vehicle, a moving person, a stationary person, etc. At block 803, the PMD can check whether the determined frequency spectrum of the holder motion matches a frequency spectrum of a moving vehicle. If it is determined that the determined frequency spectrum of the holder motion matches with a frequency spectrum of a moving vehicle, the PMD can conclude that it is docked in a moving vehicle and select operation mode D at block 804. If it is determined that the determined frequency spectrum of the holder motion does not match with a frequency spectrum of a moving vehicle, the PMD can check whether the determined frequency spectrum of the holder motion matches with a frequency spectrum of a stationary vehicle at block 805.

If it is determined that the determined frequency spectrum of the holder motion matches with a frequency spectrum of a stationary vehicle, the PMD can conclude that it is docked in a stationary vehicle and select operation mode G at block 806. If it is determined that the determined frequency spectrum of the holder motion does not match with a frequency spectrum of a stationary vehicle, the PMD can check whether the determined frequency spectrum of the holder motion matches with a frequency spectrum of a stationary surface, e.g., a table, at block 807. If it is determined that the determined frequency spectrum of the holder motion matches with a frequency spectrum of a stationary surface, the PMD can conclude that it is docked and placed on a stationary surface and select operation mode G at block 808. If it is determined that the determined frequency spectrum of the holder motion does not match with a frequency spectrum of a stationary surface, the PMD selects a default operation mode at block 809. As described above, any of the modes illustrated in FIG. 5 (or a different mode) of operation can be designated as the default mode.

It will be appreciated that process 800 described herein is illustrative and that variations and modifications are possible. Acts described as sequential can be executed in parallel, order of acts can be varied, and acts can be modified or combined. For instance, instead of selecting a default mode at block 809, the PMD can display an error message on its screen and prompt the user to select a mode of operation. In some embodiments, the PMD may be programmed to find the closet match when comparing the determined frequency spectrum to the one or more frequency spectra since it is unlikely that two frequency spectra will be an exact match. In some embodiments, the PMD may be equipped with a "learn" feature. In this embodiment, once the PMD determines a frequency spectrum for a motion, the PMD can include that frequency spectrum in its list of stored frequency spectra and associate a mode of operation with that frequency spectrum creating a custom frequency spectrum for the PMD. For instance, if the PMD belongs to a person A, the PMD can determine a frequency spectrum associated with the person A walking and store that frequency spectrum in its storage device. Since it is unlikely that a frequency spectrum of a person B walking will be the same as that of person A, the PMD can be programmed to perform certain functions if it detects being held by person A. In some embodiments, the PMD may be programmed to lock itself if it detects that is being held by someone other than person A, thus providing a unique security feature which can be hard to circumvent. In some embodiments, the information from the GPS device can be used to determine holder motion status. For example, if the GPS coordinates of the holder change over time, it can be concluded that the holder is moving. Based on the difference in the GPS coordinates and elapsed time, it may be possible to determine how fast the holder is moving, e.g., whether it is more likely in a moving car or being carried by a walking person.

FIG. 9 is a flow diagram for a process 900 for determining a holder motion status corresponding to the PMD resting on a surface, according to an embodiment of the present invention. Prior to the start of process 900, the PMD may have determined that it is resting on a surface, e.g., using process 700 described above. In an embodiment, process 900 can be used to determine the motion status of the surface (holder motion status). At block 901, similarly to block 801 of process 800, the PMD can determine a frequency spectrum associated with the holder motion, e.g., the motion of the surface. In some embodiments, the frequency spectrum of the holder motion can be determined using information received from the accelerometer and the GPS device. Once the frequency spectrum of the holder motion is determined, the PMD can compare the frequency spectrum to one or more frequency spectra stored in its storage device, at block 902. At block 903, the PMD can check whether the determined frequency spectrum of the holder motion matches with a frequency spectrum of a moving vehicle. If it is determined that the determined frequency spectrum of the holder motion matches with a frequency spectrum of a moving vehicle, the PMD can conclude that it is resting on a surface in a moving vehicle, e.g., the passenger seat, and select operation mode B at block 904. If it is determined that the determined frequency spectrum of the holder motion does not match with a frequency spectrum of a moving vehicle, the PMD can check whether the determined frequency spectrum of the holder motion matches a frequency spectrum of a stationary surface at block 905.

If it is determined, at block 905, that the determined frequency spectrum of the holder motion matches a frequency spectrum of a stationary surface, the PMD can conclude that it is resting on a stationary surface and select operation mode F at block 906. In some embodiments, the stationary surface can be located in a stationary vehicle, e.g., seat of a parked car. In other embodiments, the stationary surface can be a table located in a room. If it is determined that the determined frequency spectrum of the holder motion does not match with a frequency spectrum of a stationary surface, the PMD can select a default operation mode at block 907. As described above, any of the modes (or a different mode) of operation can be designated as the default mode. In some embodiments, the default mode at block 907 can be different from the default mode at block 809; i.e. the default mode for the holder status "docked" can be different from the default mode for the holder status "resting" and holder status "handheld."

It will be appreciated that process 900 described herein is illustrative and that variations and modifications are possible. Acts described as sequential can be executed in parallel, order of acts can be varied, and acts can be modified or combined. In some embodiments, once the PMD determines that it is located on a stationary surface at block 905, the PMD can further determine whether the stationary surface in located in a vehicle or otherwise. In this embodiment, the PMD can continually analyze the frequency spectrum of the holder motion over a period of time to determine a holder motion status. For instance, suppose that the PMD determines that it is resting on a surface in a moving vehicle. After some time if the vehicle stops, there will likely be no change in the orientation angle and GPS coordinates of the PMD if the PMD is left resting in the vehicle. However, the frequency spectrum of motion will change since the vehicle is now stopped. In this instance, the PMD can conclude that it is still in the vehicle but that the vehicle has stopped moving. If the user has assigned a particular mode of operation for that instance, the PMD may select that mode of operation.

FIG. 10 is flow diagram for a process 1000 for determining a holder motion status corresponding to the PMD being held by a person, according to an embodiment of the present invention. Prior to start of process 1000, the PMD may have determined that it is being held by a person, e.g., using process 700. At block 1001, the PMD can determine a frequency spectrum associated with the holder motion, e.g., the motion of the person. In some embodiments, the frequency spectrum of the holder motion can be determined using information received from the accelerometer. Once the frequency spectrum of the holder motion is determined, the PMD can compare the frequency spectrum to one or more frequency spectra stored in its storage device, at block 1002. At block 1003, the PMD can determine whether the person is located in a moving vehicle based on the determined frequency spectrum. If it is determined that the person is located in a moving vehicle based on comparison of the determined frequency spectrum to the one or more stored frequency spectra, the PMD can conclude that it is being held by a person who is in a moving vehicle and select operation mode A at block 1004. If the PMD determines that the person is not located in a moving vehicle, the PMD can check whether the person is nonetheless volitionally moving or stationary, block 1005. In some embodiments, volitional movement of a person, other than being in a moving vehicle, can include jogging, running, and walking. Each of these movements can have a distinct frequency spectrum associated with it. At block 1005, the PMD can compare the determined frequency spectrum to one of the frequency spectra associated with the volitional movements of the person, e.g., walking, running, and jogging, to check whether the person is moving. If it is determined that the person is moving, the PMD can concluded that it is being held by a person who is moving, but is not in a vehicle, and select operation mode C at block 1006. If it is determined that the person is not moving, the PMD can select a default mode of operation at block 1007.

It will be appreciated that process 1000 described herein is illustrative and that variations and modifications are possible. Acts described as sequential can be executed in parallel, order of acts can be varied, and acts can be modified or combined. For instance, if the PMD determines that the person is not moving, at block 1005, instead of selecting a default mode, the PMD may select mode F. In some embodiments, a separate mode of operation may be defined each for walking, running, and jogging. In this instance, when the PMD determines that the person is moving at block 1005, process 1000 may proceed to determine whether the person is walking, running or jogging. Once it is determined whether the person is walking, running or jogging, an appropriate mode of operation can be selected from among the defined modes of operation for walking, running or jogging.

While the invention has been described with respect to specific embodiments, those skilled in the art will recognize that numerous modifications are possible. In some embodiments, the PMD may be capable of determining complex and/or multiple types of motion. For instance, if the PMD is being used by a person located in a moving vehicle, the PMD may further determine whether it is being used by the driver of the vehicle or a passenger in the vehicle based on the orientation angle and location of the PMD in the vehicle. In such an instance, the PMD may operate differently if being held by the driver than if being held by a passenger, e.g., certain applications and/or features can be enabled or disabled. For example, if the PMD determines that is being held by the driver, the PMD can disable the text messaging feature of the PMD to prevent the driver from sending or receiving text messages while driving. The PMD may use other motion sensors in addition to or in lieu of the motion sensors described above. For example, the PMD can detect its location using cell phone tower triangulation method or using WiFi hotspots in instances where a GPS signal is not available or where the PMD is not equipped with a GPS device.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for operating a portable media device, the method comprising, by the portable media device:
   determining a holder status for the portable media device based on readings from a plurality of motion sensors disposed within the portable media device, wherein determining the holder status comprises:
      determining an orientation angle of the portable media device based on the readings from the plurality of motion sensors;
      in response to determining the orientation angle, determining whether the determined orientation angle corresponds to a stored orientation angle associated with a holder status; and
      determining the holder status based on the holder status associated with the corresponding stored orientation angle;
   determining a holder motion status in response to determining the holder status, wherein determining the holder motion status comprises:
      determining a frequency spectrum;
      in response to determining the frequency spectrum, determining whether the determined frequency spectrum corresponds to a reference frequency spectrum associated with a holder motion status; and
      determining the holder motion status based on the holder motion status associated with the corresponding reference frequency spectrum;
   selecting a mode of operation for the portable media device based at least in part on the holder status and the holder motion status; and
   operating the portable media device in the selected mode of operation.

2. The method of claim 1 wherein determining the holder status includes determining whether the portable media device is docked, whether the portable device is resting on a surface, or whether the portable media device is being hand-held by a user.

3. The method of claim 1 wherein the stored orientation angle comprises a first orientation angle associated with the portable media device being docked and a second orientation angle associated with the portable media device resting on a surface.

4. The method of claim 1 further comprising;
   determining whether the orientation angle fluctuates between two or more values within a given period of time; and
      determining that the portable media device is handled by a user if the orientation angle fluctuates between the two or more values in the given period of time.

5. The method of claim 4 wherein the period of time is between 1 minute and 5 minutes.

6. The method of claim 1 wherein the reference frequency spectrum comprises a first reference frequency spectrum corresponding to a moving vehicle, a second reference frequency spectrum corresponding to a stationary vehicle, a third reference frequency spectrum corresponding to a stationary surface, and a fourth reference frequency spectrum corresponding to a moving person.

7. The method of claim 6 wherein the fourth reference frequency spectrum corresponding to a moving person includes information about whether the person is walking, jogging, or running.

8. The method of claim 6, wherein determining whether the determined frequency spectrum corresponds to a reference frequency spectrum comprises:
   determining that the determined frequency spectrum does not correspond to the first reference frequency spectrum; and
   in response to determining that the determined frequency spectrum does not correspond to the first reference frequency spectrum, determining whether the determined frequency spectrum corresponds to the second reference frequency spectrum.

9. The method of claim 8, wherein determining whether the determined frequency spectrum corresponds to the second reference frequency spectrum comprises:
   determining that the determined frequency spectrum does not correspond to the second reference frequency spectrum; and
   in response to determining that the determined frequency spectrum does not correspond to the second reference frequency spectrum, determining whether the determined frequency spectrum corresponds to the third reference frequency spectrum.

10. A non-transitory computer-readable storage medium storing a plurality of instructions, that when executed by a processor in a portable media device having an accelerometer and a gyroscope, causes the processor to perform a method for operating the portable media device, the method comprising:
    determining a current motion status of the portable media device, wherein determining the current motion status includes:
       determining a holder status of portable media device, the holder status including information about whether the portable media player is docked, whether the portable media player is resting on a surface, or whether the portable media player is being held by a person; and
       determining a holder motion status of the portable media device in response to determining the holder status, the holder motion status including information about whether the portable media device is located in a moving vehicle, whether the portable media device is located in a stationary vehicle, whether the portable media device is being held by a moving person, or whether the portable media device is being held by a stationary person;
    selecting a mode of operation based on the current motion status of the portable media device; and
    operating the portable media device in the selected mode.

11. The non-transitory computer-readable storage medium of claim 10 wherein determining the holder status includes:
    determining an orientation angle of the portable media player based on readings from the gyroscope and the accelerometer; and
    comparing the determined orientation angle with one or more stored orientation angles corresponding to a docked position, a resting position, and a handheld position of the portable media device.

12. The non-transitory computer-readable storage medium of claim 10 wherein determining the holder motion status includes determining a frequency spectrum associated with the portable media device motion and comparing the determined frequency spectrum with frequency spectra associated with a moving vehicle, a stationary vehicle, a moving person, and a stationary person.

13. The non-transitory computer-readable storage medium of claim 10 wherein determining the holder motion status includes using a global positioning system (GPS) signal.

14. The non-transitory computer-readable storage medium of claim 10 wherein the vehicle includes an automobile, a motorcycle, and a bicycle.

15. A portable media device comprising:
an accelerometer;
a gyroscope;
a memory device; and
a processor coupled to the memory device, the accelerometer, and the gyroscope, wherein the processor is configured to:
determine whether the portable media device is docked, resting on a surface, or being handled by a person based on readings from the accelerometer and the gyroscope;
in response to determining whether the portable media device is docked, resting on a surface or being handled by a person, determine whether the portable media device is in a moving vehicle, in a stationary vehicle, being held by a moving person, or being held by a person who is stationary based on readings from the accelerometer and the gyroscope;
select a mode of operation for the portable media device based on the determination about whether the portable media device is docked, resting on a surface or being handled by a person and the determination about whether the portable media device is in a moving vehicle, in a stationary vehicle, being held by a moving person, or being held by a person who is stationary; and
operate the portable media device in the selected mode.

16. The portable media device of claim 15 further comprising a global positioning system (GPS) device; and wherein the processor is further configured to receive a signal from the GPS device and use the signal from the GPS device to determine whether the portable media device is in a moving vehicle, in a stationary vehicle, being held by a moving person, or being held by a person who is stationary.

17. The portable media device of claim 15 wherein the processor is configured to determine whether the portable media device is docked, resting on a surface, or being handled by a person by determining an orientation angle of the portable media device based on information received from the gyroscope and comparing the determined orientation angle to one or more known orientation angles associated with one or more holder statuses.

18. The portable media device of claim 15 wherein the processor determines whether the portable media device is in a moving vehicle, in a stationary vehicle, being held by a moving person, or being held by a person who is stationary, by receiving frequency spectrum information of a current motion of the portable media device from the accelerometer and gyroscope and comparing the frequency spectrum information of the current motion of the portable media device to one or more frequency spectra corresponding to a moving vehicle, a stationary vehicle, a moving person, and a stationary person.

19. The portable media device of claim 15 wherein the processor is further configured to communicate information about the selected mode to an application resident on the portable media device.

20. A method for controlling an application resident on a portable media device, the method comprising, by the portable media device:
determining a current motion status of the portable media device, wherein the current motion status is determined based on information received from an accelerometer and a gyroscope included in the portable media device, comprising:
determining whether the portable media device is docked, resting on a surface, or being held by a person; and
in response to determining whether the portable media device is docked, resting on a surface, or being held by a person, determining whether the portable media device is in a moving vehicle, in a stationary vehicle, being held by a moving person, or being held by a stationary person;
selecting a mode for the portable media device based at least in part on the current motion status;
communicating the selected mode to an application resident on the portable media device; and
operating the application according to the selected mode.

21. The method of claim 20 wherein the application is a navigation application.

22. The method of claim 20 wherein determining the current motion status of the portable media device includes:
determining an orientation angle of the portable media device; and
determining a frequency spectrum associated with a motion of the portable media device, wherein determining whether the portable media device is docked, resting on a surface, or being held by a person is based at least in part on the orientation angle, and wherein determining whether the portable media device is in a moving vehicle, in a stationary vehicle, being held by a moving person, or being held by a stationary person is based at least in part on the frequency spectrum.

23. The method of claim 20 wherein operating the application according to the selected mode includes setting operation parameters of the application based on the selected mode.

* * * * *